(12) United States Patent
Herchen (10) Patent No.: US 7,500,781 B1
(45) Date of Patent: Mar. 10, 2009

(54) METHOD AND APPARATUS FOR DETECTING SUBSTRATE TEMPERATURE IN A TRACK LITHOGRAPHY TOOL

(75) Inventor: Harald Herchen, Los Altos, CA (US)

(73) Assignee: Sokudo Co., Ltd., Kyoto (JP)

( * ) Notice: Subject to any disclaimer, the term of this patent is extended or adjusted under 35 U.S.C. 154(b) by 0 days.

(21) Appl. No.: 11/924,433

(22) Filed: Oct. 25, 2007

(51) Int. Cl.
*G01K 1/14* (2006.01)
*G01K 7/16* (2006.01)
*H05B 3/68* (2006.01)

(52) U.S. Cl. .................. 374/208; 374/141; 374/185; 219/444.1

(58) Field of Classification Search .......... 374/141, 374/185, 208; 219/444.1
See application file for complete search history.

(56) References Cited

U.S. PATENT DOCUMENTS

| | | | | |
|---|---|---|---|---|
| 6,084,215 A | * | 7/2000 | Furuya et al. ............ | 219/444.1 |
| 6,481,886 B1 | * | 11/2002 | Narendrnath et al. ....... | 374/141 |
| 2004/0004990 A1 | * | 1/2004 | Khan ......................... | 374/161 |
| 2004/0208228 A1 | * | 10/2004 | Hashikura et al. ............ | 374/179 |
| 2004/0211767 A1 | * | 10/2004 | Hiramatsu et al. ........ | 219/444.1 |
| 2006/0140248 A1 | * | 6/2006 | Gotthold et al. ............. | 374/161 |
| 2007/0086503 A1 | * | 4/2007 | Fujii ............................ | 374/1 |

* cited by examiner

*Primary Examiner*—Gail Verbitsky
*Assistant Examiner*—Mirellys Jagan
(74) *Attorney, Agent, or Firm*—Townsend and Townsend and Crew LLP (57) ABSTRACT

The temperature of a wafer is measured using thermal sensors that are embedded in elastomeric diaphragms positioned in holes formed in a support layer of a bake plate. A pressure differential caused by heating the bake plate causes the elastomeric diaphragms to contact the wafer. The thermal sensors determine the temperature of the wafer at the locations where the elastomeric diaphragms contact the wafer.

18 Claims, 10 Drawing Sheets

*Heat causes pressure differential*

METHOD AND APPARATUS FOR DETECTING SUBSTRATE TEMPERATURE IN A TRACK LITHOGRAPHY TOOL

BACKGROUND OF THE INVENTION

The present invention relates generally to the field of substrate processing equipment. More particularly, the present invention relates to a method and apparatus for measuring thermal characteristics of a semiconductor wafer in a processing apparatus. Merely by way of example, the method and apparatus of the present invention are used to measure temperatures in a track lithography tool. The method and apparatus can be applied to other processes for semiconductor substrates including other processing chambers.

Modern integrated circuits contain millions of individual elements that are formed by patterning the materials, such as silicon, metal and dielectric layers, that make up the integrated circuit to sizes that are small fractions of a micrometer. The technique used throughout the industry for forming such patterns is photolithography. A typical photolithography process sequence generally includes depositing one or more uniform photoresist (resist) layers on the surface of a substrate, drying and curing the deposited layers, patterning the substrate by exposing the photoresist layer to radiation that is suitable for modifying the exposed layer and then developing the patterned photoresist layer.

It is common in the semiconductor industry for many of the steps associated with the photolithography process to be performed in a multi-chamber processing system (e.g., a cluster tool) that has the capability to sequentially process semiconductor wafers in a controlled manner. One example of a cluster tool that is used to deposit (i.e., coat) and develop a photoresist material is commonly referred to as a track lithography tool.

Track lithography tools typically include a mainframe that houses multiple chambers (which are sometimes referred to herein as stations) dedicated to performing the various tasks associated with pre- and post-lithography processing. There are typically both wet and dry processing chambers within track lithography tools. Wet chambers include coat and/or develop bowls, while dry chambers include thermal control units that house bake and/or chill plates. Track lithography tools also frequently include one or more pod/cassette mounting devices, such as an industry standard FOUP (front opening unified pod), to receive substrates from and return substrates to the clean room, multiple substrate transfer robots to transfer substrates between the various stations of the track tool and an interface that allows the tool to be operatively coupled to a lithography exposure tool in order to transfer substrates into the exposure tool and to receive substrates after they have been processed within the exposure tool.

Over the years there has been a strong push within the semiconductor industry to shrink the size of semiconductor devices. The reduced feature sizes have caused the industry's tolerance to process variability to shrink, which in turn, has resulted in semiconductor manufacturing specifications having more stringent requirements for process uniformity and repeatability. An important factor in minimizing process variability during track lithography processing sequences is to ensure that every substrate processed within the track lithography tool for a particular application has the same "wafer history." A substrate's wafer history is generally monitored and controlled by process engineers to ensure that all of the device fabrication processing variables that may later affect a device's performance are controlled, so that all substrates in the same batch are always processed the same way.

To ensure that each substrate has the same "wafer history" requires that each substrate experiences the same repeatable substrate processing steps (e.g., consistent coating process, consistent hard bake process, consistent chill process, etc.) and the timing between the various processing steps is the same for each substrate. Lithography type device fabrication processes can be especially sensitive to variations in process recipe variables and the timing between the recipe steps, which directly affects process variability and ultimately device performance. Generally, characterization of processing operations is performed to determine the thermal properties of processing apparatus as a function of time.

Work in relation with the present invention suggests that current techniques used to determine temperatures may be somewhat indirect and less than ideal. For example, techniques that measure temperatures only at selected locations near the wafer may not measure temperatures at many locations near the wafer leading to reduced knowledge of their effect on the wafer processing history. Although substrate supports made of highly heat conductive metals such as aluminum may be used to spread heat from a source to provide uniform heating of the wafer, some non-uniformity in heat applied to the wafer can persist, and thermal measurements from such substrate supports can be somewhat indirect.

In view of these requirements and shortcomings, the semiconductor industry is continuously researching methods and developing tools and techniques to improve the thermal measurement capabilities associated with track lithography and other types of cluster tools.

SUMMARY OF THE INVENTION

According to the present invention, techniques related to the field of semiconductor processing equipment are provided. More particularly, the present invention relates to a method and apparatus for measuring thermal characteristics of a semiconductor processing apparatus. Merely by way of example, the method and apparatus of the present invention are used to measure wafer temperature using thermal sensors that are embedded in elastomeric diaphragms positioned in holes formed in a support layer of a bake plate. A pressure differential from heating the bake plate causes the elastomeric diaphragms to contact the wafer. The thermal sensors determine the temperature of the wafer at the locations where the elastomeric diaphragms contact the wafer. The method and apparatus can be applied to other processes for semiconductor substrates including other processing chambers.

In many embodiments, an apparatus for measuring a temperature of a semiconductor wafer includes an elastomeric diaphragm positioned in a hole formed in a structure for supporting the wafer and a thermal sensor embedded in the elastomeric diaphragm. A pressure differential causes air in the hole to push the elastomeric diaphragm against a surface of the wafer such that the thermal sensor determines the temperature of the wafer.

In many embodiments, a bake plate for processing a semiconductor wafer includes a heating element, a supporting layer, elastomeric diaphragms and a thermal sensor embedded in each elastomeric diaphragm. The heating element is adapted to heat the wafer to establish a wafer temperature. The supporting layer is positioned above the heating element and is adapted to support the wafer. Holes are formed in the supporting layer. An elastomeric diaphragm is positioned in each hole of the supporting layer. A pressure differential created in response to heat from the heating element causes the elastomeric diaphragms to contact a surface of the wafer such that the thermal sensors determine the temperature of the wafer.

In many embodiments, a method of measuring a temperature of a semiconductor wafer is provided. The method includes contacting the wafer with a structure to conduct heat from the wafer to the structure. The structure contacts the wafer in response to a pressure differential. The structure comprises an elastomeric diaphragm having an embedded thermal sensor. A temperature of the wafer is determined using the thermal sensor.

Many benefits are achieved by way of the present invention over conventional techniques. For example, embodiments of the present invention provide temperature measurements of semiconductor wafers and bake plates with improved reliability, repeatability and accuracy. Additionally, embodiments of the present invention provide for improved wafer processing history, in particular repeatable heating of semiconductor wafers with bake plates. Depending upon the embodiment, one or more of these benefits, as well as other benefits, may be achieved. These and other benefits will be described in more detail throughout the present specification and more particularly below in conjunction with the following drawings.

DETAILED DESCRIPTION OF THE INVENTION

According to the present invention, techniques related to the field of semiconductor processing equipment are provided. More particularly, the present invention relates to a method and apparatus for measuring thermal characteristics of a semiconductor processing apparatus. Merely by way of example, the method and apparatus of the present invention are used to measure temperatures in a track lithography tool. The method and apparatus can be applied to other processes for semiconductor substrates including other processing chambers.

Figure 1:
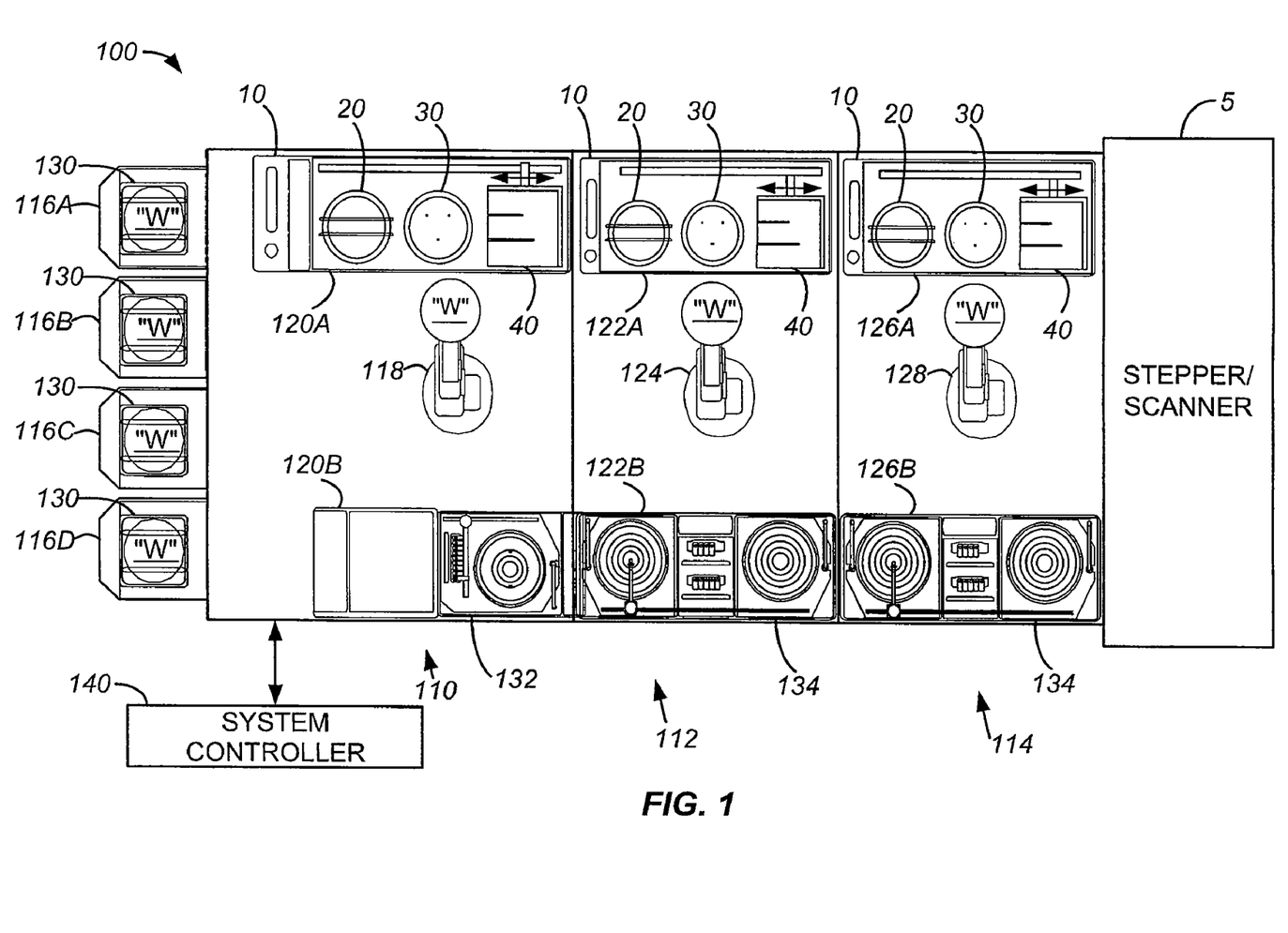
FIG. 1 is a simplified plan view of a track lithography tool according to embodiments of the present invention.

FIG. 1 is a plan view of one embodiment of a track lithography tool 100 in which the embodiments of the present invention may be used. As illustrated in FIG. 1, a cluster tool, for example track lithography tool 100, contains a front end module 110 (sometimes referred to as a factory interface), a central module 112, and a rear module 114 (sometimes referred to as a scanner interface). Front end module 110 generally contains one or more pod assemblies or FOUPS (e.g., items 116A-D), a front end robot 118, and front end processing racks 120A and 120B. The one or more pod assemblies 116A-D are generally adapted to accept one or more cassettes 130 that may contain one or more substrates, for example semiconductor material sliced to form thin semiconductor wafer substrates "W", that are to be processed in track lithography tool 100.

Central module 112 generally contains a first central processing rack 122A, a second central processing rack 122B, and a central robot 124. Rear module 114 generally contains first and second rear processing racks 126A and 126B and a back end robot 128. Front end robot 118 is adapted to access processing modules in front end processing racks 120A and 120B; central robot 124 is adapted to access processing modules in front end processing racks 120A and 120B, central processing racks 122A and 122B and/or rear processing racks 126A and 126B; and back end robot 128 is adapted to access processing modules in the rear processing racks 126A and 126B and in some cases exchange substrates with a stepper/scanner 5.

The stepper/scanner 5, which may be purchased from Canon USA, Inc. of San Jose, Calif., Nikon Precision Inc. of Belmont, Calif., or ASML US, Inc. of Tempe, Ariz., is a lithographic projection apparatus used, for example, in the manufacture of integrated circuits (ICs). The stepper/scanner 5 exposes a photosensitive material (resist), deposited on the substrate in the cluster tool, to some form of electromagnetic radiation to generate a circuit pattern corresponding to an individual layer of the integrated circuit (IC) device to be formed on the substrate surface.

Each of the processing racks 120A and 120B; 122A and 122B; and 126A and 126B contain multiple processing modules in a vertically stacked arrangement. That is, each of the processing racks may contain multiple stacked integrated thermal units 10, multiple stacked coater modules 132, multiple stacked coater/developer modules 134 with shared dispense, or other modules that are adapted to perform the various processing steps required of a track photolithography tool. As examples, coater modules 132 may deposit a bottom antireflective coating (BARC), coater/developer modules 134 may be used to deposit and/or develop photoresist layers, and integrated thermal units 10 may perform bake and chill operations associated with hardening BARC and/or photoresist layers.

In one embodiment, a system controller 140 is used to control all of the components and processes performed in the track lithography tool 100. The controller 140 is generally adapted to communicate with the stepper/scanner 5, monitor and control aspects of the processes performed in the track lithography tool 100, and is adapted to control all aspects of the complete substrate processing sequence. In some instances, controller 140 works in conjunction with other controllers, such as controllers of control circuitry 56a-56d in FIG. 2, which control bake plate 22 and chill plate 30 of integrated thermal unit 10 to control certain aspects of the processing sequence. The controller 140, which is typically a microprocessor-based controller, is configured to receive inputs from a user and/or various sensors in one of the processing chambers and appropriately control the processing chamber components in accordance with the various inputs and software instructions retained in the controller's memory. The controller 140 generally contains memory and a CPU (not shown) which are utilized by the controller to retain various programs, process the programs, and execute the programs when necessary. The memory (not shown) is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits (not shown) are also connected to the CPU for supporting the processor in a conventional manner. The support circuits may include cache, power supplies, clock circuits, input/output circuitry, subsystems, and the like all well known in the art. A program (or computer instructions) readable by the controller 140 determines which tasks are performable in the processing chamber (s). Preferably, the program is software readable by the controller 140 and includes instructions to monitor and control the process based on defined rules and input data.

It is to be understood that embodiments of the invention are not limited to use with a track lithography tool such as that depicted in FIG. 1. Instead, embodiments of the invention may be used in any substrate processing tool including the many different tool configurations described in U.S. application Ser. No. 11/112,281, filed on Apr. 22, 2005, entitled "Cluster Tool Architecture for Processing a Substrate," which is hereby incorporated by reference for all purposes, and other configurations not described in the Ser. No. 11/112,281 application.

Figure 2:
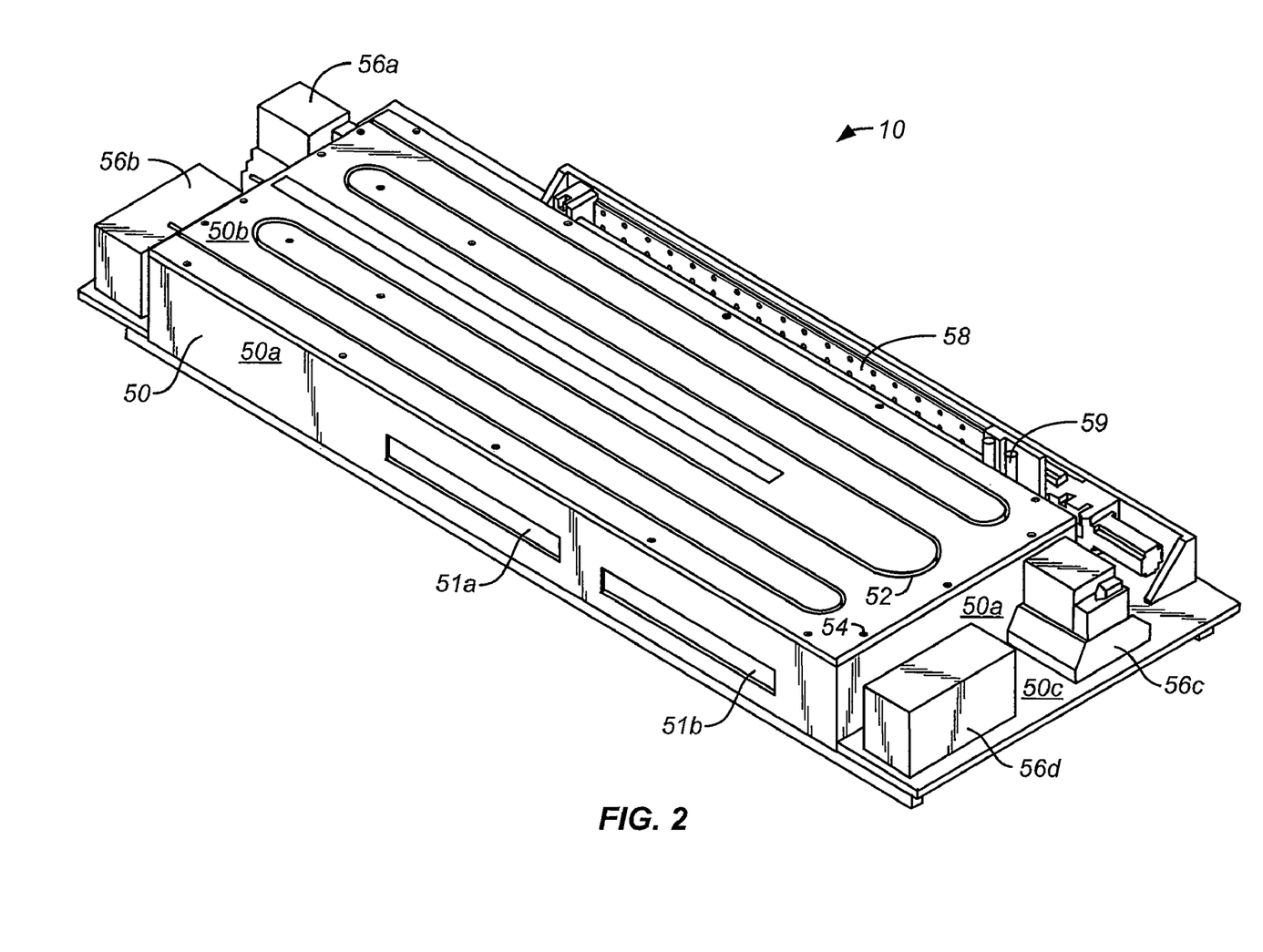
FIG. 2 is a simplified perspective view of a thermal unit according to embodiments of the present invention.

As shown in FIG. 2, which is a simplified perspective view of integrated thermal unit 10 depicted in FIG. 1, thermal unit 10 includes an exterior housing 50 made of aluminum or another suitable material. Housing 50 is long relative to its height in order to allow bake station 20, chill plate 30 and shuttle 40 (shown in FIG. 1) to be laterally adjacent to each other and to allow multiple integrated thermal units to be stacked on top of each other in a track lithography tool as described above with respect to FIG. 1. In one particular embodiment, housing 50 is just 20 centimeters high.

Housing 50 includes side pieces, a top piece 50b and a bottom piece 50c. Front side piece 50a includes two elongated openings 51a and 51b that allow substrates to be transferred into and out of the thermal unit. Opening 51a is operatively coupled to be closed and sealed by a shutter (not shown), and opening 51b is also operatively coupled to be closed and sealed by a shutter (also not shown). Top piece 50b of housing 50 includes coolant channels 52 that allow a coolant fluid to be circulated through the channels in order to control the temperature of top piece 50b when an appropriate plate (not shown) is attached to top piece 50b via screw holes 54. Similar coolant channels are formed in the lower surface of bottom piece 50c.

Also shown in FIG. 2 is various control circuitry 56a-56d which controls the precision baking operation of bake station 20 and the precision cooling operation of chill plate 30; and tracks 58 and 59 that enable shuttle 40 (shown in FIG. 3) to move linearly along the length of the thermal unit and vertically within the thermal unit. In one embodiment, control circuitry 56a-56b is positioned near bake station 20 and chill plate 30 in order to enable more accurate and responsive control of temperature adjusting mechanisms associated with each station.

Figure 3:
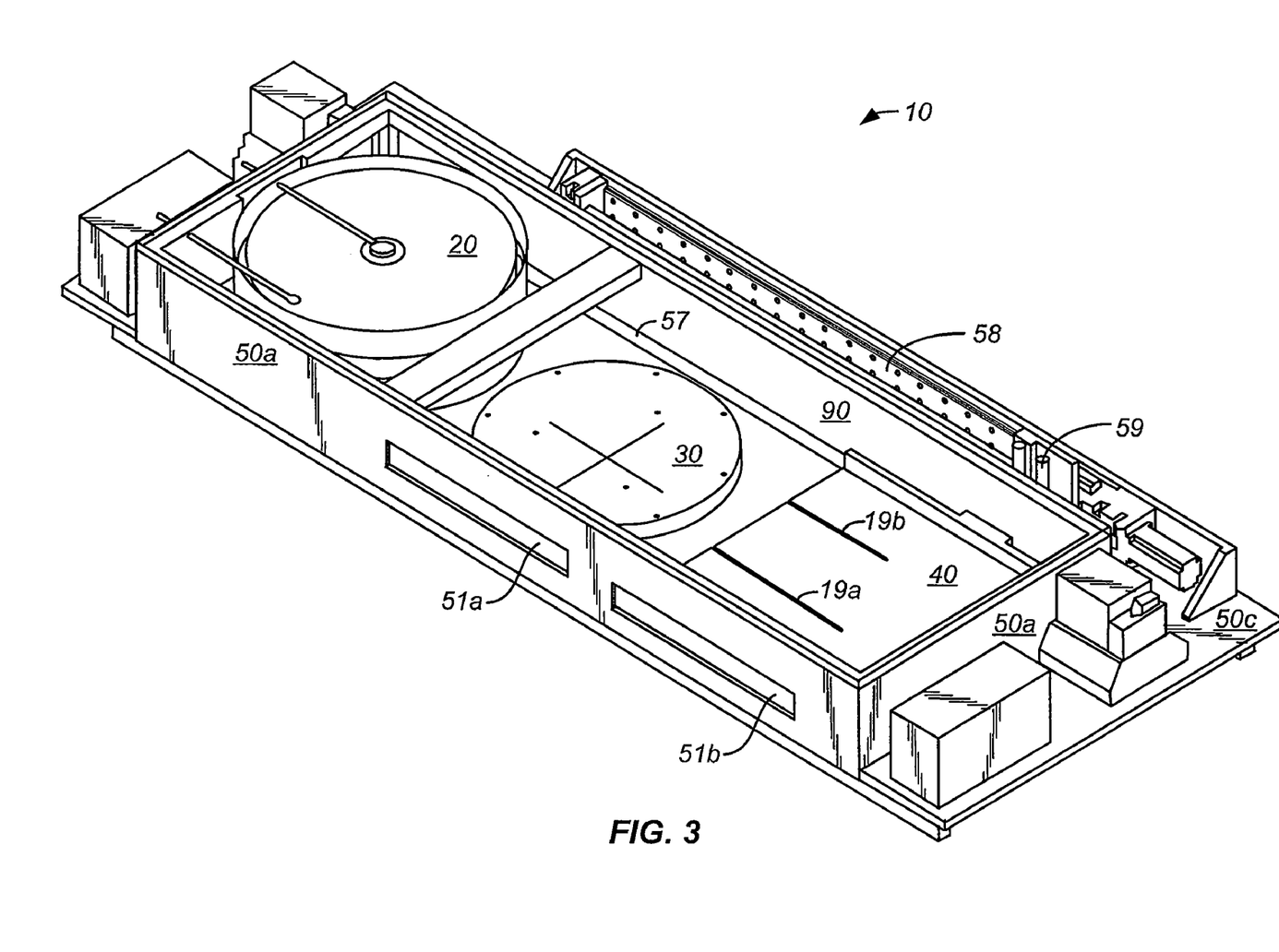
FIG. 3 is a simplified perspective view of the integrated thermal unit depicted in FIG. 2 with the top of the unit removed, according to embodiments of the present invention.

FIG. 3 is a simplified perspective view of integrated thermal unit 10 as seen with top piece 50b removed. In FIG. 3, shuttle 40, chill plate 30 and bake station 20 are visible. Also visible is a space 57 between rear support piece 90 of housing 50 and bottom piece 50c. Space 57 extends along much of the length of integrated thermal unit 10 to allow shuttle 40 to transfer wafers between bake station 20 and chill plate 30.

Figure 4:
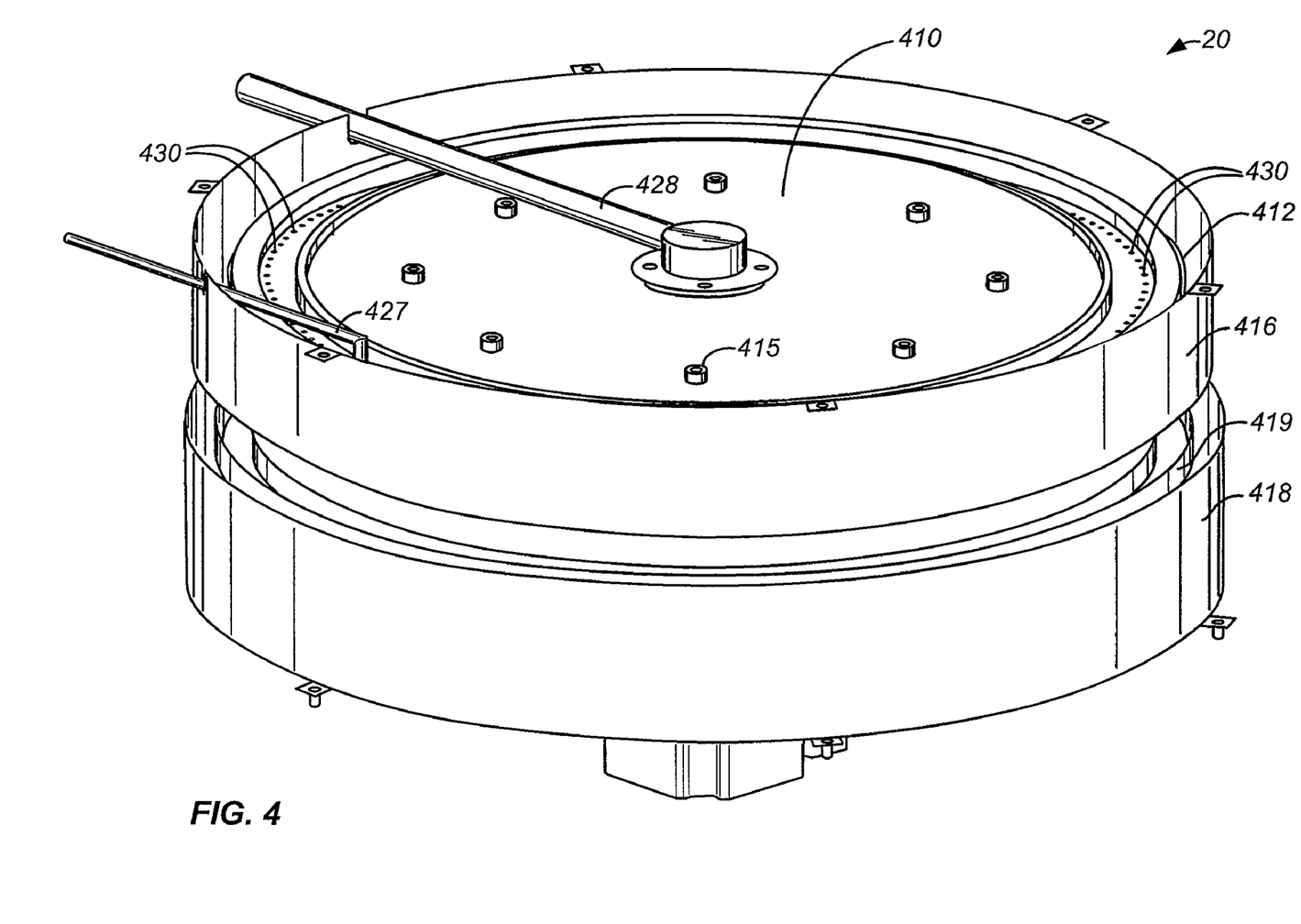
FIG. 4 is a perspective view of the bake station as shown in FIG. 3, according to embodiments of the present invention.
Figure 5:
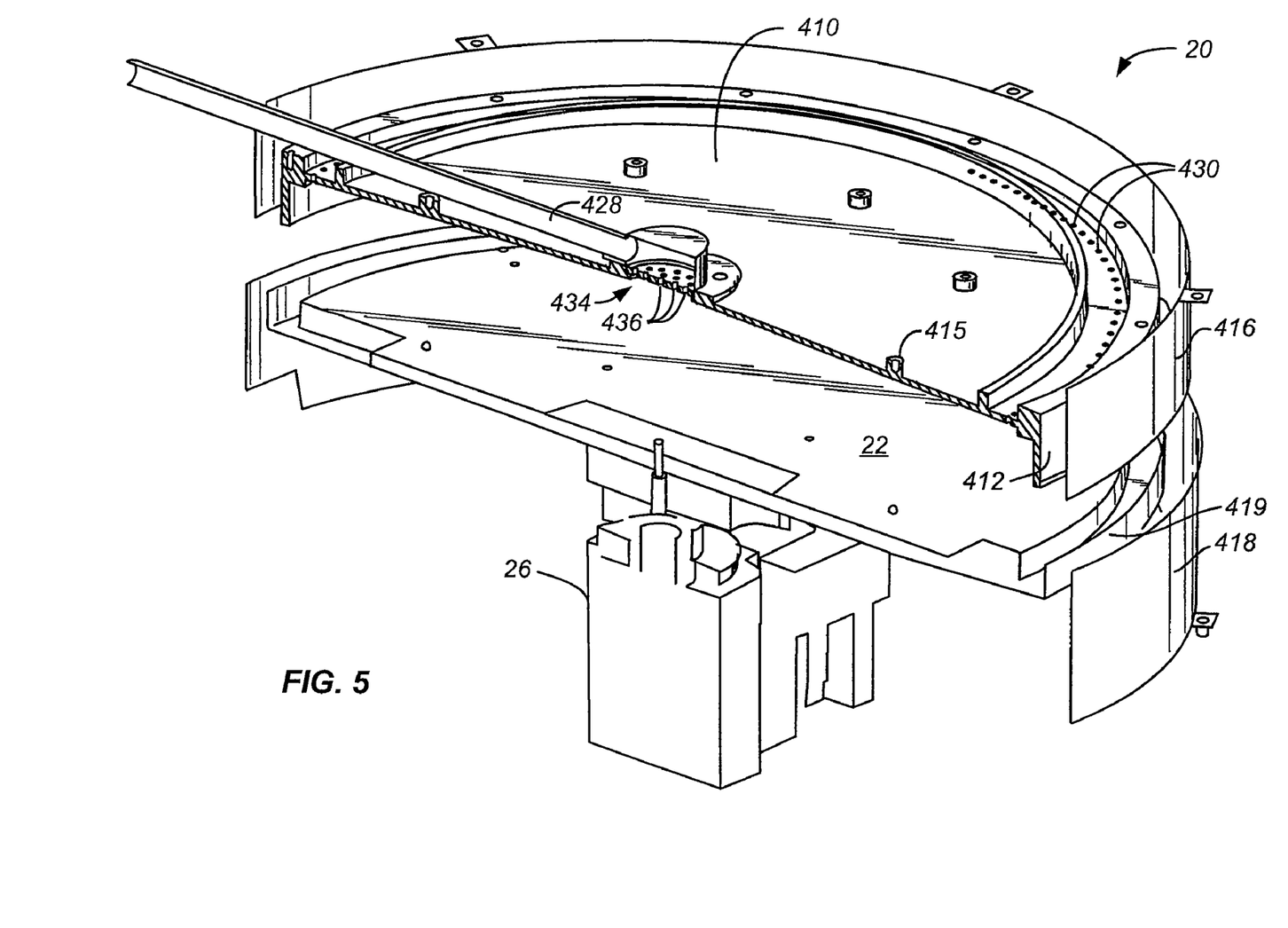
FIG. 5 is a perspective view of a cross-section of the bake station as shown in FIG. 4, according to embodiments of the present invention.
Figure 6:
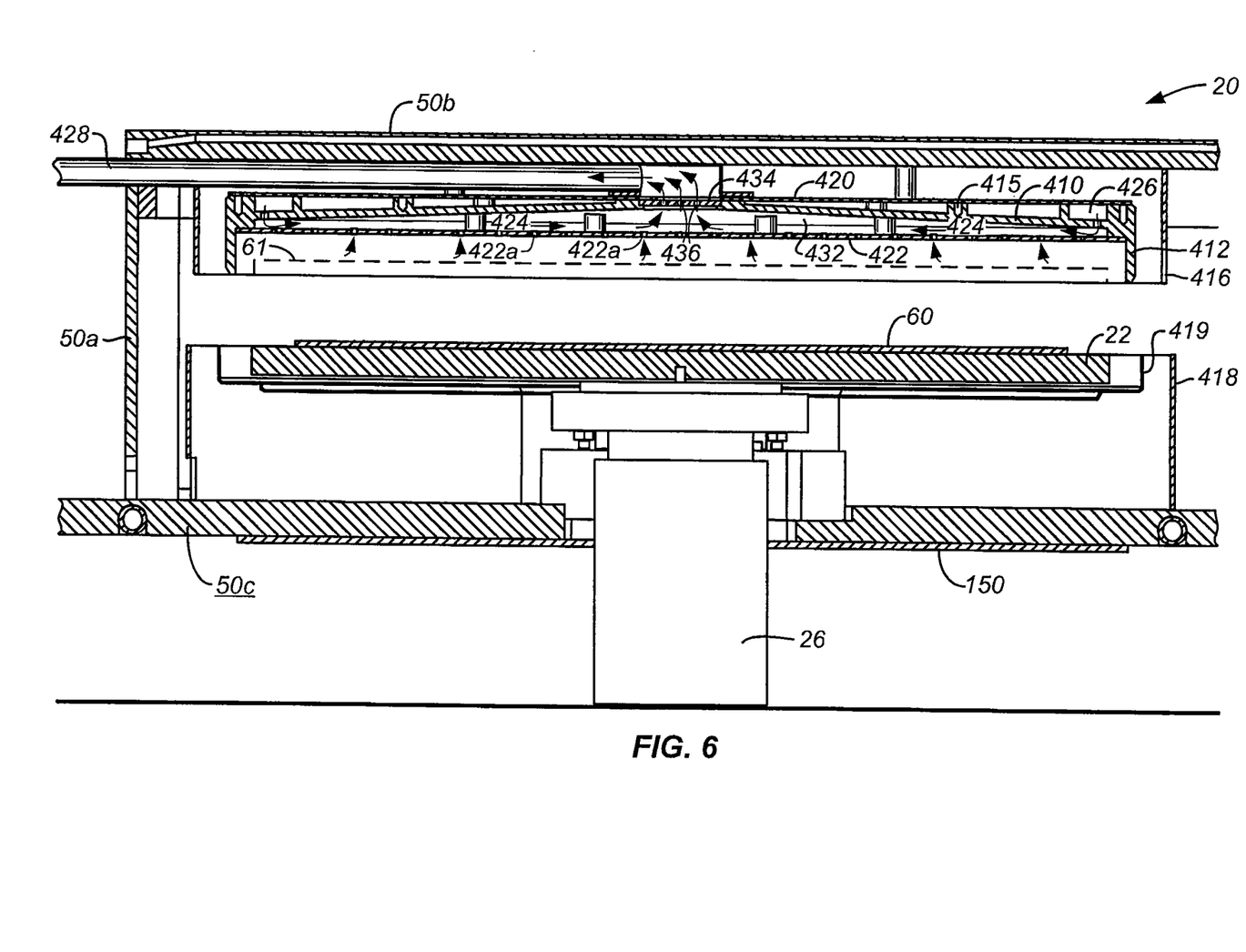
FIG. 6 is a cross-sectional view of the bake station as shown in FIG. 5, according embodiments of the present invention.

FIG. 4 is a perspective view of bake station 20 shown in FIG. 3 according to one embodiment; FIG. 5 is a perspective view of a cross-section of bake station 20 shown FIG. 4, and FIG. 6 is a cross-sectional view of the bake station 20. As shown in FIGS. 4-6, bake station 20 has three separate isothermal heating elements: bake plate 22, top heat plate 410 and side heat plate 412, each of which is manufactured from a material exhibiting high heat conductivity, such as aluminum or other appropriate material. Each plate 22, 410, and 412 has a heating element, for example resistive heating elements, embedded within the plate. Bake station 20 also includes side, top and bottom heat shields 416 and 418, respectively, as well as a bottom cup 419 that surrounds bake plate 22 and a lid 420 (shown in FIG. 6 only). Each of heat shields 416, 418, cup 419 and lid 420 are made from aluminum. Lid 420 is attached to top heat plate 410 by eight screws through threaded holes 415.

Bake plate 22 is operatively coupled to a motorized lift 26 so that the bake plate can be raised into the clam shell enclosure and lowered into a wafer receiving position. Typically, wafers are heated on bake plate 22 when it is raised to a baking position 61 as shown in FIG. 6. When in baking position 61, cup 419 encircles a bottom portion of side heat plate 412 forming a clam shell arrangement that helps confine heat generated by bake plate 22 within an inner cavity formed by the bake plate and the enclosure. In one embodiment the upper surface of bake plate 22 includes 8 wafer pocket buttons and 17 proximity pins similar to those with respect to shuttle 40 and chill plate 30. Also, in one embodiment bake plate 22 includes a plurality of vacuum ports and can be operatively coupled to a vacuum chuck to secure a wafer to the bake plate during the baking process.

During the baking process, a faceplate 422 is positioned just above and opposite the upper surface of bake plate 22. Faceplate 422 can be made from aluminum as well as other suitable materials and includes a plurality of holes or channels 422a that allow gases and contaminants baked off the surface of a wafer being baked on bake plate 22 to drift through faceplate 422 and into a radially inward gas flow 424 that is created between faceplate 422 and top heat plate 410.

Gas from radially inward gas flow 424 is initially introduced into bake station 20 at an annular gas manifold 426 that encircles the outer portion of top heat plate 410 by a gas inlet line 427. Gas manifold 426 includes numerous small gas inlets 430 (128 inlets in one embodiment) that allow gas to flow from manifold 426 into the cavity 432 between the lower surface of top heat plate 410 and the upper surface of faceplate 422. The gas flows radially inward towards the center of the station through a diffusion plate 434 that includes a plurality of gas outlet holes 436. After flowing through diffusion plate 434, gas exits bake station 20 through gas outlet line 428.

Bake plate 22 heats a wafer substrate 60 according to a particular thermal recipe. One component of the thermal recipe is typically a set point temperature at which the bake plate is set to heat the wafer substrate. During the baking process, the temperature of the wafer support is routinely measured and one or more zones of the bake plate can be adjusted to ensure uniform heating of the substrate. In many embodiments, bake plate 22 is heated to the desired set point temperature while a large batch of wafers are processed according to the same thermal recipe. Thus, for example, if a particular thermal recipe calls for a set point temperature of 175° C. and that recipe is to be implemented on 100 consecutive wafers, bake plate 22 will be heated to 175° C. during the period of time it takes to process the 100 consecutive wafers.

Figure 7:
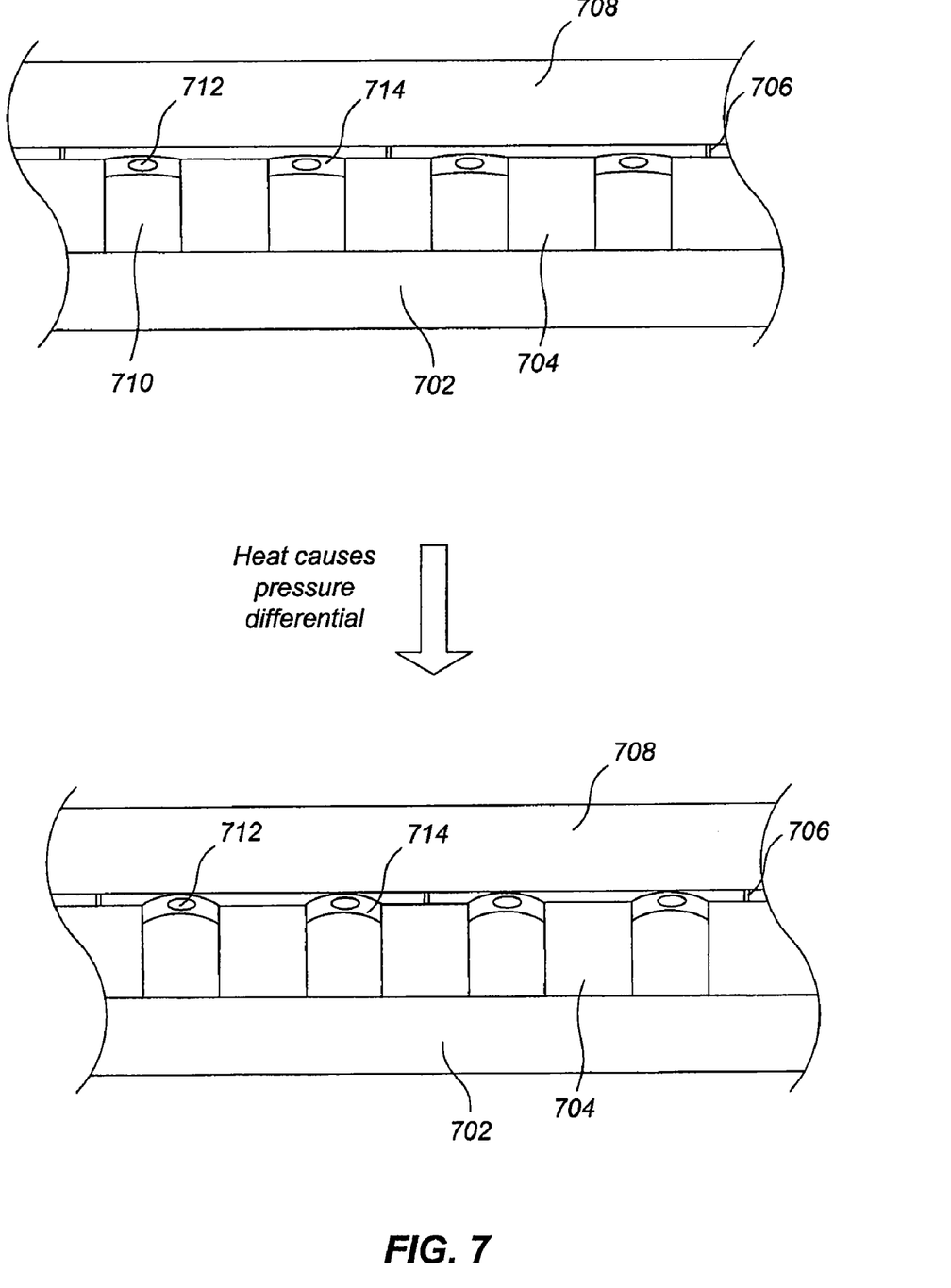
FIG. 7 shows a simplified cross sectional view of a bake plate comprising a substrate support layer having several thermal sensors embedded in elastomeric diaphragms that contact a semiconductor wafer in response to a pressure differential, according to embodiments of the present invention.

FIG. 7 shows a simplified cross sectional view of a bake plate comprising a substrate support layer having several thermal sensors embedded in elastomeric diaphragms that contact a semiconductor wafer in response to a pressure differential, according to embodiments of the present invention. The bake plate comprises a heating element layer 702 and a support layer 704. The bake plate is made of thermally conductive material such as aluminum nitride, stainless steel, copper, graphite, or other metals or ceramics as would be appreciated by one having ordinary skill in the art. The support layer 704 includes proximity pins 706 that support a semiconductor wafer 708 thereby forming a space between the support layer 704 and the semiconductor wafer 708. Holes 710 are formed in the support layer 704 and several elastomeric diaphragms 714 each including an embedded thermal sensor 712 are positioned in the holes 710 at an upper surface of the support layer 704.

When the heating element layer 702 increases from an initial temperature to a steady state temperature, air in the holes 710 and in the space between the support layer 704 and the semiconductor wafer 708 is heated. The heated air expands and moves upward in the holes 710 and under the semiconductor wafer 708. The air may escape from under the semiconductor wafer 708 at edges of the wafer. The heated air may also move toward an interior of the semiconductor wafer 708 where vacuum vents remove the air.

The heated air in the holes 710 and under the semiconductor wafer 708 causes a pressure differential. Specifically, the pressure below the semiconductor wafer 708 becomes higher than the pressure above the semiconductor wafer 708. As one having ordinary skill in the art would appreciate, the pressure differential may be caused by a source other than the heating of the bake plate. For example, an external pressure source may be used to generate the pressure differential.

The pressure differential induces a vacuum below the semiconductor wafer 708 such that the proximity pins 706 may flatten a bowed wafer. In one embodiment, the vacuum pressure is approximately 30 Pascals. In further response to the pressure differential, the elastomeric diaphragms 714 expand upward to contact a bottom surface of the semiconductor wafer 708. Thus, the thermal sensors 712 respond to the wafer temperature and provide temperature signals that correspond to the temperature sensed at the surface of the semiconductor wafer 708.

According to embodiments of the invention, the thermal sensor 712 is a resistance temperature detector (RTD) formed from a resistive material. In some embodiments, the RTD is formed of platinum, because of its linear resistance-temperature relationship and its chemical inertness. The resistance ideally varies linearly with temperature, but any necessary calibrations to eliminate 'strain gauge' effects caused by the different thermal expansion rates of the substrate and platinum can also be made. The thermal sensor 712 can be formed in many patterns, for example serpentine, sinusoidal, a spiral circular pattern with increasing radius, and rectangular rows, as appropriate for a particular application.

The temperature response of the RTD is delayed approximately one second by the presence of the elastomer between the RTD and the wafer, as well as by the non-zero thermal mass of the embedded thermal sensor 712 and the elastomer. The delay is sufficiently short to allow for correction of the wafer temperature during the heating process. The wafer temperature may be modified from the bake plate temperature due to changes in the surroundings such as the lid, ambient quiescent or flowing air, and radiative heat transfer.

According to embodiments of the invention, the elastomeric diaphragm 714 is made of resilient and compliant material that contacts the bottom surface of the semiconductor wafer 708 in response to the pressure differential without scratching the wafer or generating particles on the wafer. The flexible quality of the elastomeric diaphragm 714 allows each thermal sensor 712 to quickly respond to the temperature at the surface of the semiconductor wafer 708 regardless of variations in distance between the support layer 704 and the wafer 708. The distance between the elastomeric diaphragm 714 and the semiconductor wafer 708 is selected such that the elastomeric diaphragm 714 contacts the surface of the wafer in response to the pressure differential. In one embodiment, the distance between the elastomeric diaphragm 714 and the semiconductor wafer 708 is on the order of tens of microns. The elastomeric diaphragm 714 is made of a material having a relatively low thermal conductivity to prevent an inaccurate temperature reading due to thermal flux from the support layer 704. In one embodiment, the elastomeric diaphragm 714 is made of low durometer perfluorocarbon.

One benefit of having the thermal sensors 712 embedded in elastomeric diaphragms 714 is appreciated when cleaning the surface of the bake plate. When wiping the bake plate, the thermal sensors 712 are not exposed at the surface of the bake plate. In other words, the elastomeric diaphragms 714 protect the thermal sensors 712 from damage during the cleaning process.

Figure 8A:
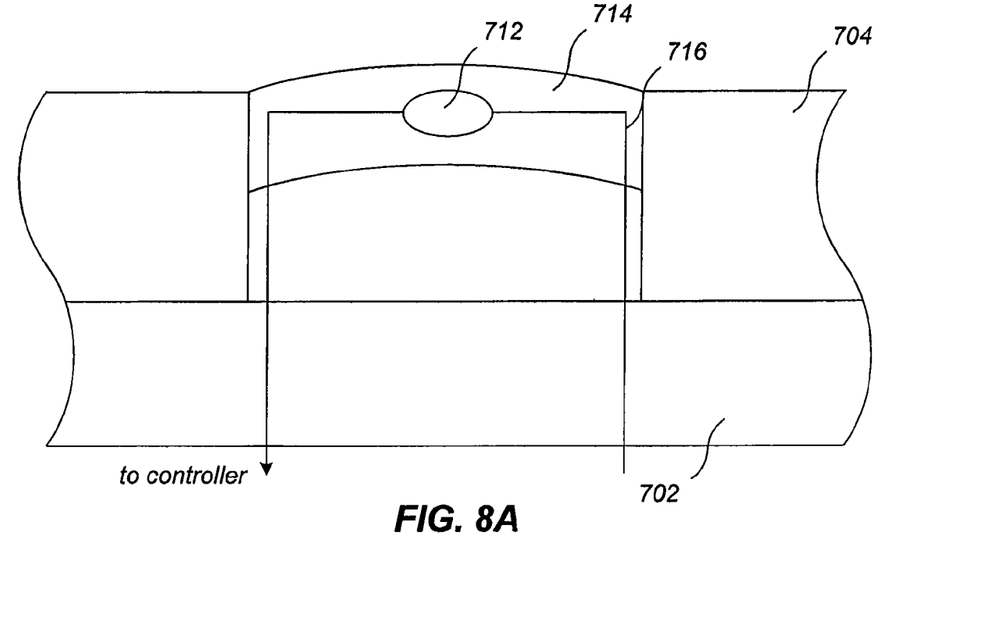
FIGS. 8A and 8B show the thermal sensors as in FIG. 7 in greater detail, according to embodiments of the present invention.
Figure 8B:
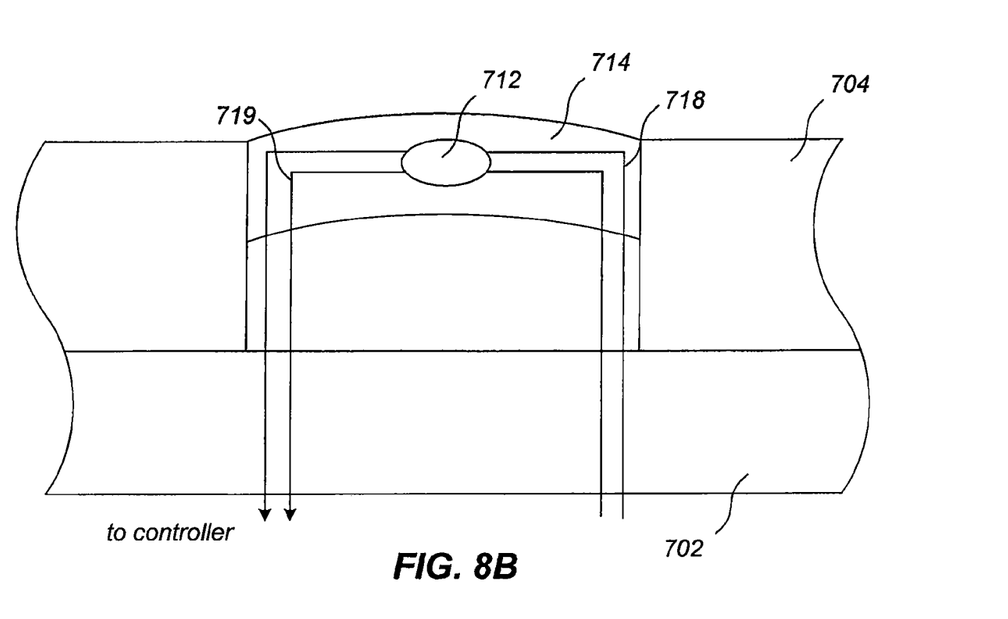

FIG. 8A and FIG. 8B show the temperature sensor embedded in the elastomeric diaphragm as in FIG. 7 in greater detail, according to embodiments of the present invention. FIG. 8A shows the thermal sensor 712 connected to a controller using two wires 716. The thermal sensor 712 requires at least two wires because the RTD is essentially a single resistor. When the thermal sensor 712 responds to temperature, an electrical signal is transmitted to the controller via the wires 716.

The thermal sensor 712 is resilient to withstand repeated expansion and retraction of the elastomeric diaphragm 714 while providing the necessary electrical information. In one embodiment, the wires are polymeric conductors. The polymeric conductors are resilient and may flex repeatedly while providing the necessary electrical information. The polymeric conductors also exhibit poor thermal conductivity which ensures that heat loss from the thermal sensor 712 to the wires 716 is minimal thereby reducing the impact of the heat loss on the measured temperature.

FIG. 8B shows the thermal sensor 712 connected to a controller using four wires 718, 719. The four-wire thermal sensor may improve performance to compensate for the resistance inherent in the wire. The increase in the number of wires does not make the RTD itself inherently more accurate. Rather, the four-wire RTD is beneficial because a voltage drop in a conductive polymer is high enough to skew the readings of a two or three wire RTD.

The wires 716, 718, 719 are embedded in the elastomeric diaphragm 714 near the thermal sensor and exit the elastomeric diaphragm 714 near the support layer 704 because edges of the diaphragm are rigid due to the attachment to the support layer 704. The wires 716, 718, 719 extend from a bottom of the bake plate for electrical coupling to the controller.

Figure 9:
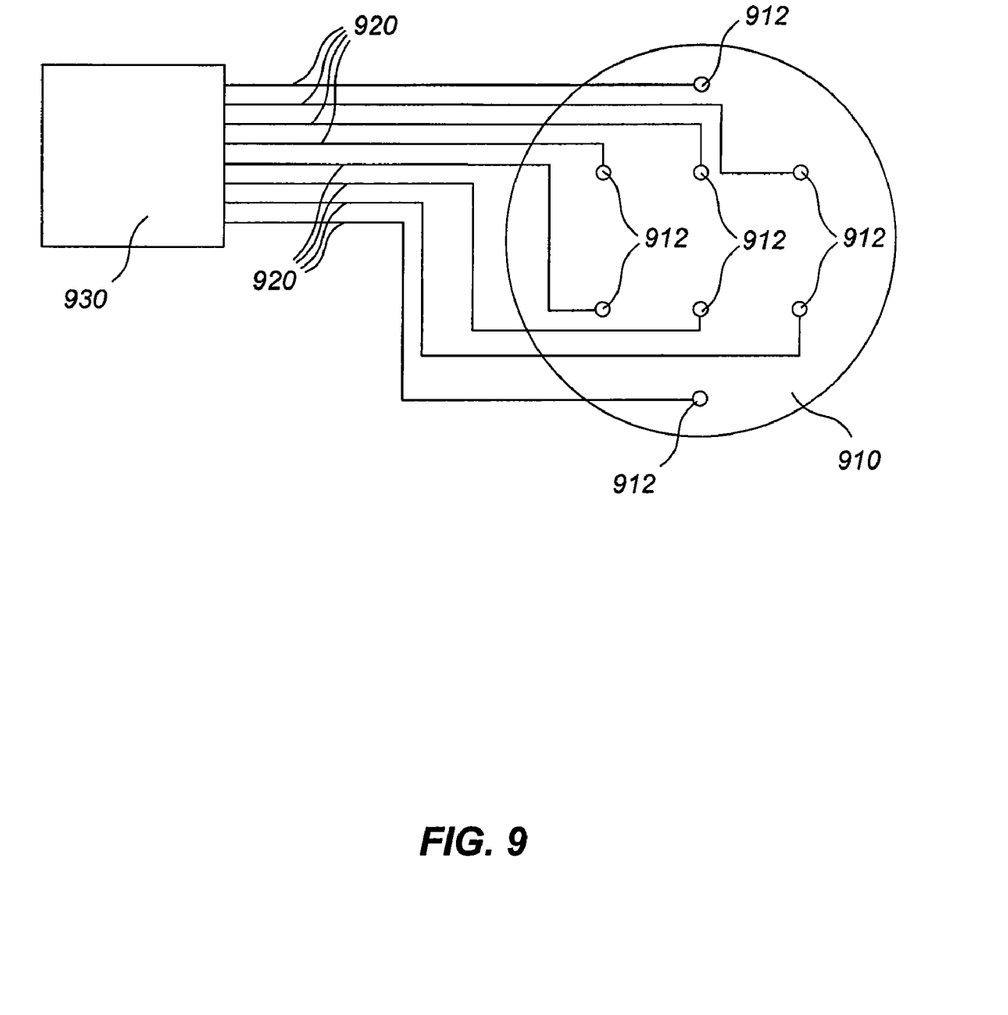
FIG. 9 shows a bake plate comprising several thermal sensors to map the temperature of the wafer, according to embodiments of the present invention.

FIG. 9 shows a bake plate 910 comprising several thermal sensors 912 to map the temperature of the wafer, according to embodiments of the present invention. The thermal sensors 912 sense the temperature of the wafer in response to a pressure differential while the wafer is positioned on the support plate. The thermal sensors 912 are each embedded in an elastomeric diaphragm as described above. The thermal sensors 912 can be coupled to a controller 930 with wires 920 to determine the temperature of the wafer at each thermal sensor location.

Figure 10:
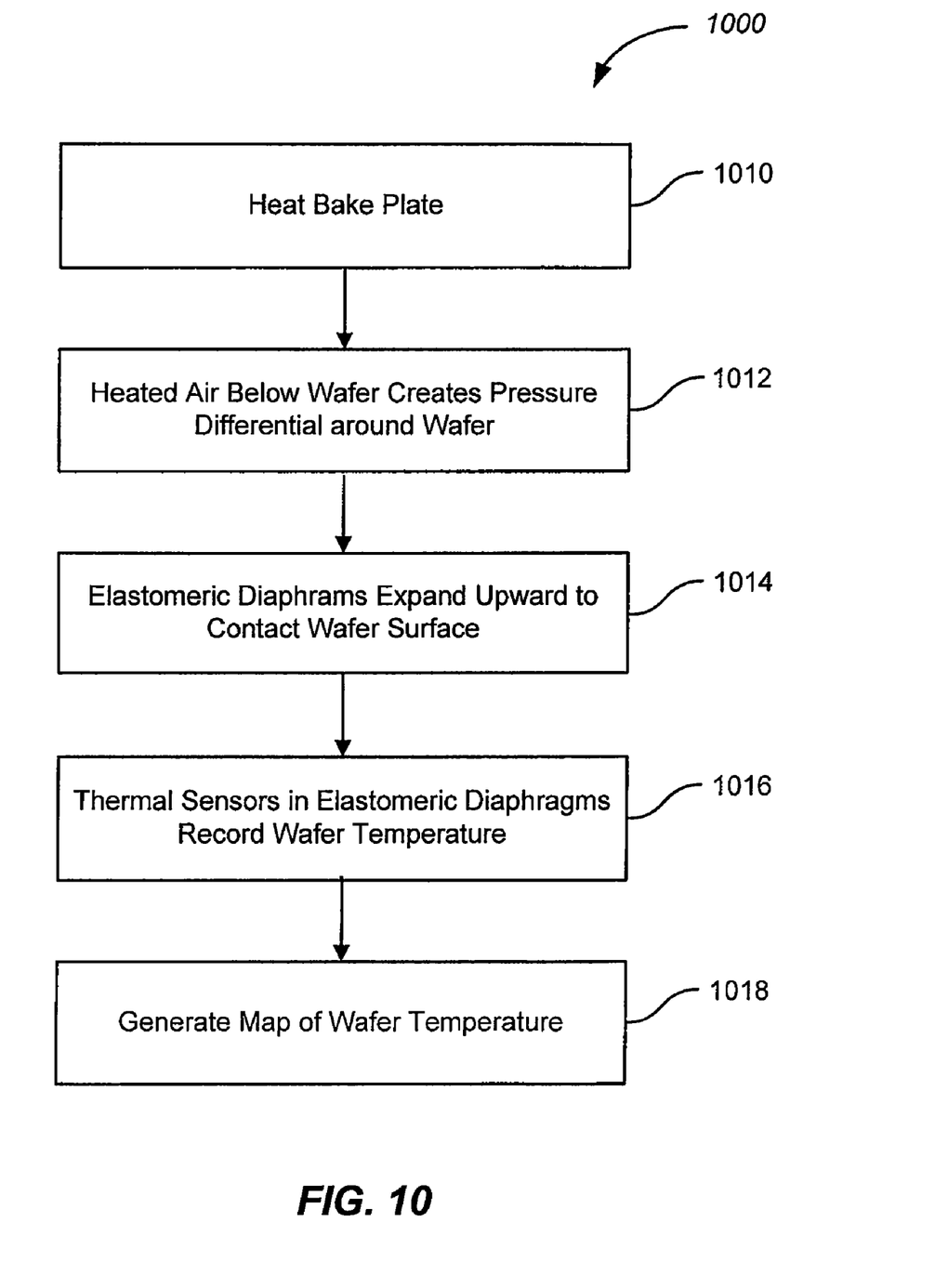
FIG. 10 shows a method of measuring a temperature of a semiconductor wafer, according to embodiments of the present invention.

FIG. 10 shows a method 1000 of measuring a temperature of a semiconductor wafer, according to embodiments of the present invention. The bake plate is heated as described above (step 1010). The air below the wafer and above the bake plate is heated thereby causing a pressure differential (step 1012). Air in holes of the bake plate respond to the pressure differential by causing elastomeric diaphragms positioned at an upper portion of the holes to expand upward from the bake plate to contact a bottom surface of the wafer (step 1014). Thermal sensors embedded in the elastomeric diaphragms determine the temperature of the wafer at the locations where the elastomeric diaphragms contact the wafer and provide temperature signals corresponding to the determined temperature to a controller (1016). A map is generated based on the temperature signals to indicate the wafer temperature at the locations on the wafer where the thermal sensors determined the temperature (step 1018).

It should be appreciated that the specific steps illustrated in FIG. 10 provide a particular method of measuring a temperature of a semiconductor wafer, according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

While the exemplary embodiments have been described in some detail for clarity of understanding and by way of example, a variety of additional modifications, adaptations, and changes may be clear to those of skill in the art. Hence, the scope of the present invention is limited solely by the appended claims, along with the full scope of their equivalents.

What is claimed is:

1. An apparatus for measuring a temperature of a semiconductor wafer, the apparatus comprising:
    an elastomeric diaphragm positioned in a hole formed in a structure for supporting the wafer; and
    a thermal sensor embedded in the elastomeric diaphragm,
    wherein a pressure differential generated in response to heat causes air in the hole to push the elastomeric diaphragm against a surface of the wafer such that the thermal sensor determines the temperature of the wafer.

2. The apparatus of claim 1 wherein the pressure differential is also generated by an external pressure source.

3. The apparatus of claim 1 wherein the pressure differential causes the pressure on one surface of the wafer to be higher than the pressure on an opposite surface of the wafer.

4. The apparatus of claim 1 wherein the thermal sensor is a resistance temperature detector.

5. The apparatus of claim 1 wherein the elastomeric diaphragm comprises low durometer perfluorocarbon.

6. The apparatus of claim 1 wherein the elastomeric diaphragm comprises material having low thermal conductivity.

7. The apparatus of claim 1 wherein the thermal sensor comprises resilient material.

8. The apparatus of claim 1 further comprising at least two wires extending from the thermal sensor for providing a signal corresponding to the temperature determined by the thermal sensor to a controller.

9. The apparatus of claim 8 wherein the at least two wires are polymeric conductors.

10. The apparatus of claim 8 wherein four wires extend from the thermal sensor.

11. A bake plate for processing a semiconductor wafer, the bake plate comprising:
    a heating element adapted to heat the wafer to establish a wafer temperature;
    a supporting layer positioned above the heating element and adapted to support the wafer, wherein holes are formed in the supporting layer;
    an elastomeric diaphragm positioned in each hole of the supporting layer; and
    a thermal sensor embedded in each elastomeric diaphragm,
    wherein a pressure differential created in response to heat from the heating element causes the elastomeric diaphragms to contact a surface of the wafer such that the thermal sensors determine the temperature of the wafer.

12. The bake plate of claim 11 wherein the thermal sensor is a resistance temperature detector.

13. The bake plate of claim 11 wherein the elastomeric diaphragm comprises material having a low thermal conductivity.

14. The bake plate of claim 11 wherein the thermal sensor comprises resilient material.

15. The bake plate of claim 11 wherein the supporting layer comprises proximity pins for supporting the wafer such that an air gap exists between the supporting layer and the wafer.

16. A method of measuring a temperature of a semiconductor wafer, the method comprising:
    heating the wafer with a bake plate;
    contacting the wafer with a structure to conduct heat from the wafer to the structure, wherein the structure contacts the wafer in response to a pressure differential generated in response to heat from the bake plate, the structure comprising an elastomeric diaphragm having an embedded thermal sensor; and
    determining a temperature of the wafer using the thermal sensor.

17. The method of claim 16 further comprising also generating the pressure differential using an external pressure source.

18. The method of claim 16 further comprising mapping the temperature of the wafer at several locations of the wafer.

* * * * *